(12) United States Patent
Chang

(10) Patent No.: US 7,405,532 B2
(45) Date of Patent: Jul. 29, 2008

(54) MICROSTEPPER MOTOR DEVICE AND METHOD OF CONTROLLING THE DEVICE

(75) Inventor: Christopher C. Chang, Brentwood, CA (US)

(73) Assignee: Arcus Technology, Inc., Fremont, CA (US)

( * ) Notice: Subject to any disclaimer, the term of this patent is extended or adjusted under 35 U.S.C. 154(b) by 0 days.

(21) Appl. No.: 11/544,826

(22) Filed: Oct. 6, 2006

(65) Prior Publication Data

US 2008/0084176 A1    Apr. 10, 2008

(51) Int. Cl.
*H02P 8/34* (2006.01)
(52) U.S. Cl. ...................................... 318/696
(58) Field of Classification Search ................ 318/685, 318/696, 701
See application file for complete search history.

(56) References Cited

U.S. PATENT DOCUMENTS

| | | | | |
|---|---|---|---|---|
| 4,087,732 A | * | 5/1978 | Pritchard | 318/696 |
| 4,720,726 A | * | 1/1988 | Sato et al. | 396/244 |
| 4,855,660 A | * | 8/1989 | Wright et al. | 318/696 |
| 4,929,879 A | | 5/1990 | Wright et al. | |
| 5,783,939 A | * | 7/1998 | Lippmann et al. | 324/154 R |
| 5,849,178 A | | 12/1998 | Holm et al. | |
| 6,140,793 A | | 10/2000 | Carr et al. | |
| 6,597,147 B2 | * | 7/2003 | Li et al. | 318/696 |

* cited by examiner

*Primary Examiner*—Bentsu Ro
(74) *Attorney, Agent, or Firm*—Thomas H. Ham; Wilson & Ham

(57) ABSTRACT

A microstepper motor device and method of controlling the device uses a microcontroller that provides current sinusoidal values from at least one array of sinusoidal values to power circuitry of the device in response to control signals. The power circuitry is connected to a stepper motor of the device to supply power signals to the stepper motor using the current sinusoidal values. The microcontroller is configured to index the at least one array of sinusoidal values to the current sinusoidal values in response to the control signals as part of an interrupt service routine of the microcontroller. The microcontroller is further configured to transmit the current sinusoidal values to the power circuitry as part of a non-interrupt routine of the microcontroller.

20 Claims, 3 Drawing Sheets

MICROSTEPPER MOTOR DEVICE AND METHOD OF CONTROLLING THE DEVICE

BACKGROUND OF THE INVENTION

Stepper motor devices use motor drivers to provide power signals to the connected stepper motors in response to control signals, e.g., pulse and direction signals, from external controllers. Using a stepper motor driver without microstepping control, a typical stepper motor device will experience resonance and rough motion at low speeds. However, using a stepper motor driver with microstepping control, the resonance and rough motion problems at low speeds can be greatly reduced.

A conventional microstepper motor driver for a two-phase stepper motor includes a translator, a phase-A digital-to-analog converter (DAC), a phase-B DAC, a phase-A power converter and a phase-B power converter. The translator outputs two rectified binary sinusoidal values, which are ninety degrees out of phase, to the phase-A and phase-B DACs using control signals from an external controller. The translator also outputs two additional digital signals, which represent the polarities of the rectified sinusoidal values, to the phase-A and phase-B power converters. The phase-A DAC outputs an analog sinusoidal signal to the phase-A power converter using the received binary sinusoidal value. Similarly, the phase-B DAC outputs an analog sinusoidal signal to the phase-B power converter using the received binary sinusoidal value. The phase-A power converter outputs a current-controlled power signal to one of the coils of the connected stepper motor using the analog sinusoidal signal from the phase-A DAC and the digital polarity signal from the translator. Similarly, the phase-B power converter outputs a current-controlled power signal to the other coil of the stepper motor using the analog sinusoidal signal from the phase-B DAC and the digital polarity signal from the translator.

Common choices for the translator of a conventional microstepper motor driver includes an application-specific integrated circuit (ASIC), a field programmable gate array (FPGA) and a microcontroller. An ASIC has a low unit cost, but requires high design and non-recurring engineering (NRE) cost. A FPGA is readily available, but has a high unit cost. A microcontroller is desirable with off-the-shelf availability, wide variety of choices (8 bit to 32 bit), well proven CPU architectures (8051 to RISC), programmable using common programming language (Assembly to C) and a wide range of features and peripherals (built-in memory, flash, UART, SPI, ADC, DAC, oscillator, temperature sensor, etc.). However, in order to properly support a high rate of microstepping, a high performance microcontroller is needed, which can significantly increase the cost of the microstepper motor driver. Otherwise, the microstepping rate using a low-cost, lower performance microcontroller is limited.

Therefore, there is a need for a microstepper motor device and method for controlling the device that can support a high micrstepping rate using a low cost microcontroller.

SUMMARY OF THE INVENTION

A microstepper motor device and method of controlling the device uses a microcontroller that provides current sinusoidal values from at least one array of sinusoidal values to power circuitry of the device in response to control signals. The power circuitry is connected to a stepper motor of the device to supply power signals to the stepper motor using the current sinusoidal values. The microcontroller is configured to index the at least one array of sinusoidal values to the current sinusoidal values in response to the control signals as part of an interrupt service routine of the microcontroller. The microcontroller is further configured to transmit the current sinusoidal values to the power circuitry as part of a non-interrupt routine of the microcontroller. The configuration of the microcontroller with respect to the interrupt service routine and the non-interrupt routine allows the microcontroller to support a higher microstepping rate than a conventional microcontroller that is configured to function as a translator of a microstepper motor driver.

A microstepper motor device in accordance with an embodiment of the invention comprises a stepper motor and a motor driver. The motor driver is connected to the stepper motor to drive the stepper motor in response to control signals. The driver motor comprises power circuitry and a microcontroller. The power circuitry is connected to the stepper motor to supply power signals to the stepper motor using current sinusoidal values. The microcontroller is connected to the power circuitry to provide the current sinusoidal values from at least one array of sinusoidal values to the power circuitry. The microcontroller is configured to index the at least one array of sinusoidal values to the current sinusoidal values in response to the control signals as part of an interrupt service routine of the microcontroller. The microcontroller is further configured to output the current sinusoidal values to the power circuitry as part of a non-interrupt routine of the microcontroller.

A method of controlling a microstepper motor device in accordance with an embodiment of the invention comprises receiving control signals at a microcontroller of the microstepper motor device, indexing at least one array of sinusoidal values to current sinusoidal values in response to the control signals, outputting the current sinusoidal values to power circuitry of the microstepper motor device, and providing power signals from the power circuitry to a stepper motor of the microstepper motor device using the current sinusoidal values to drive the stepper motor. The indexing is executed as part of an interrupt service routine of the microcontroller. The outputting is executed as part of a non-interrupt routine of the microcontroller.

Other aspects and advantages of the present invention will become apparent from the following detailed description, taken in conjunction with the accompanying drawings, illustrated by way of example of the principles of the invention.

DETAILED DESCRIPTION

Figure 1:
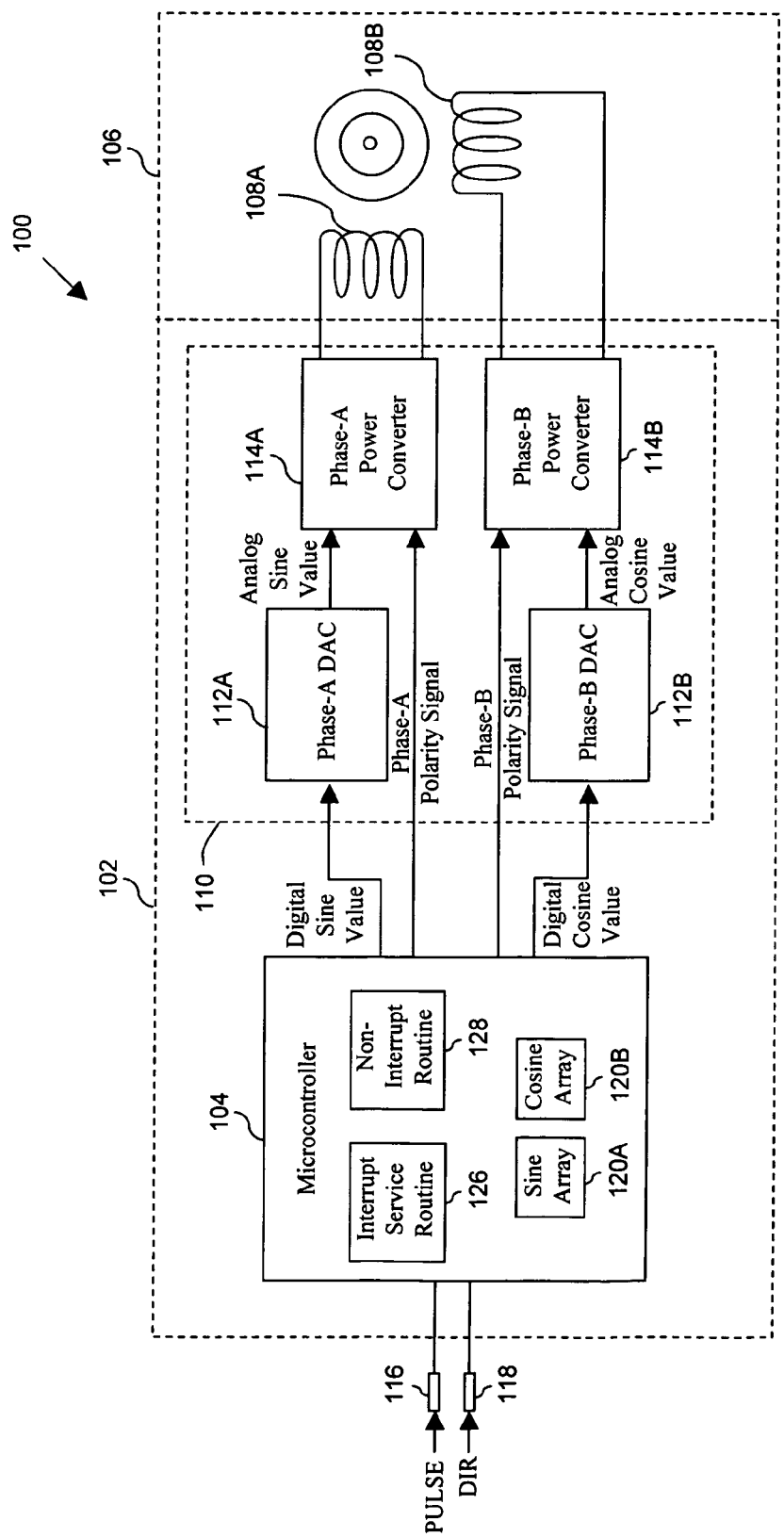
FIG. 1 is a block diagram of a microstepper motor device in accordance with an embodiment of the invention.

With reference to FIG. 1, a microstepper motor device 100 in accordance with an embodiment of the invention is described. The microstepper motor device 100 includes a motor driver 102 with microstepping control capability, which is facilitated by a microcontroller 104 that is configured to function as the translator of the driver. As described in more detail below, the microcontroller 104 is configured to exclusively perform time-sensitive microstepping control operations as part of an interrupt service routine (ISR). Other less important microstepping control operations are performed by the microcontroller 104 as part of a regular non-interrupt routine. Thus, the microcontroller 104 can support a higher accurate microstepping rate than conventional microcontrollers that are configured to function as driver translators. Alternatively, a lower cost microcontroller with slower processing speed can be used as the microcontroller 104 to support the desired microstepping rate. Thus, the stepper motor device 100 can be manufactured with lower cost and/or to support a higher accurate microstepping rate.

As shown in FIG. 1, the microstepper motor device 100 includes a stepper motor 106 and the microstepper motor driver 102, which provides power signals to two motor coils 108A and 108B of the stepper motor 106. Thus, in this embodiment, the microstepper motor device 100 is a two-phase stepper motor. However, in other embodiments, the microstepper motor device 100 may be a different multi-phase stepper motor, such as a three-phase or five-phase stepper motor. The motor driver 102 comprises the microcontroller 104 and power circuitry 110, which includes a phase-A digital-to-analog converter (DAC) 112A, a phase-B DAC 112B, a phase-A power converter 114A and a phase-B power converter 114B. The power circuitry 110 may additionally include damping and decay control components, as well as other components. However, these components are not described herein so as to not obscure the inventive features of the microstepper motor device 100.

The microcontroller 104 of the motor driver 102 is connected to pins or terminals 116 and 118 that receive pulse and direction signals, respectively, from an external controller (not shown). The microcontroller 104 is configured to output two digital signals that represent two rectified binary values of two sine waves, which are ninety degrees out of phase, in response to the pulse and direction signals from the external controller. Since these two sine waves are ninety degrees out of phase, the first sine wave will simply be referred to as the sine wave, and the second sine wave will be referred to as the cosine wave. In this embodiment, these rectified binary values of the sine and cosine waves are retrieved from two arrays 120A and 120B, which may be stored in the memory (not shown) of the microcontroller 104. The array 120A contains the rectified binary values of the sine wave, while the array 120B contains the rectified binary values of the cosine wave. The resolution of these rectified binary sine and cosine values in the arrays 120A and 120B determines the size of the microstepping control. Thus, finer microstepping control is possible with finer resolution of the binary sine and cosine values in the arrays 120A and 120B.

In an alternative embodiment, the microcontroller 104 may include only a single array of sinusoidal values, e.g., the array 120A, to retrieve the rectified binary sine and cosine values. In this alternative embodiment, the microcontroller 104 uses two pointers on the single array of sinusoidal values to select the proper pair of rectified binary values, which are ninety degrees out of phase, to retrieve the rectified binary sine and cosine values.

The microcontroller 104 is also configured to output two additional digital signals that represent the polarities of the two rectified sine and cosine values to take into consideration the rectification of the sine and cosine values. The digital polarity signal that represents the polarity of the rectified sine value will be referred to herein as the phase-A polarity signal. The digital polarity signal that represents the polarity of the rectified cosine value will be referred to herein as the phase-B polarity signal. The polarities of the sine and cosine values can be represented by an ON or OFF value. Thus, in this embodiment, each of the phase-A and phase-B polarity signals is either a high "on" signal or a low "off" signal. The polarity values of the rectified sine and cosine values may be included in the sine array 120A and the cosine array 120B, respectively.

As described in more detail below, the microcontroller 104 is configured or programmed with a high priority interrupt service routine 126, which is initiated by an edge trigger of the pulse signal from the external controller. The microcontroller 104 is also configured or programmed with a low priority non-interrupt routine 128, which can be interrupted anytime by the interrupt service routine 126. The interrupt service routine 126 and the non-interrupt routine 128 are performed by the microcontroller 104 to generate the digital sinusoidal signals and the digital phase signals.

The phase-A and phase-B DACs 112A and 112B of the power circuitry 110 are connected to the microcontroller 104 to receive the digital sinusoidal values, i.e., the digital rectified sine and cosine values. Specifically, the phase-A DAC 112A receives the digital sine value, while the phase-B DAC 112B receives the digital cosine value. The phase-A DAC 112A is configured to convert the received digital sine value to a corresponding analog signal, which is an analog representation of the received sine value. The output analog signal of the phase-A DAC 112A is transmitted to the phase-A power converter 114A. Similarly, the phase-B DAC 110B is configured to convert the received digital cosine value to a corresponding analog cosine signal, which is an analog representation of the received cosine value. The output analog signal of the phase-B DAC 112B is transmitted to the phase-B power converter 114B.

The phase-A and phase-B power converters 114A and 114B of the power circuitry 110 are connected to the microcontroller 102 to receive the phase-A and phase-B polarity signals, respectively. The phase-A and phase-B power converters 114A and 114B are also connected to the phase-A and phase-B DACs 112A and 112B, respectively, to receive the respective analog sinusoidal signals. The phase-A power converter 114A is configured to supply a current-controlled power signal to the coil 108A of the stepper motor 106 using the analog sine signal from the phase-A DAC 112A and the phase-A polarity signal from the microcontroller 104. Similarly, the phase-B power converter 114B is configured to supply a current-controlled power signal to the other coil 108B of the stepper motor 106 using the analog cosine signal from the phase-B DAC 110B and the phase-B polarity signal from the microcontroller 104. In this embodiment, the phase-A and phase-B power converters 114A and 114B are implemented as H-bridges.

Figure 2A:
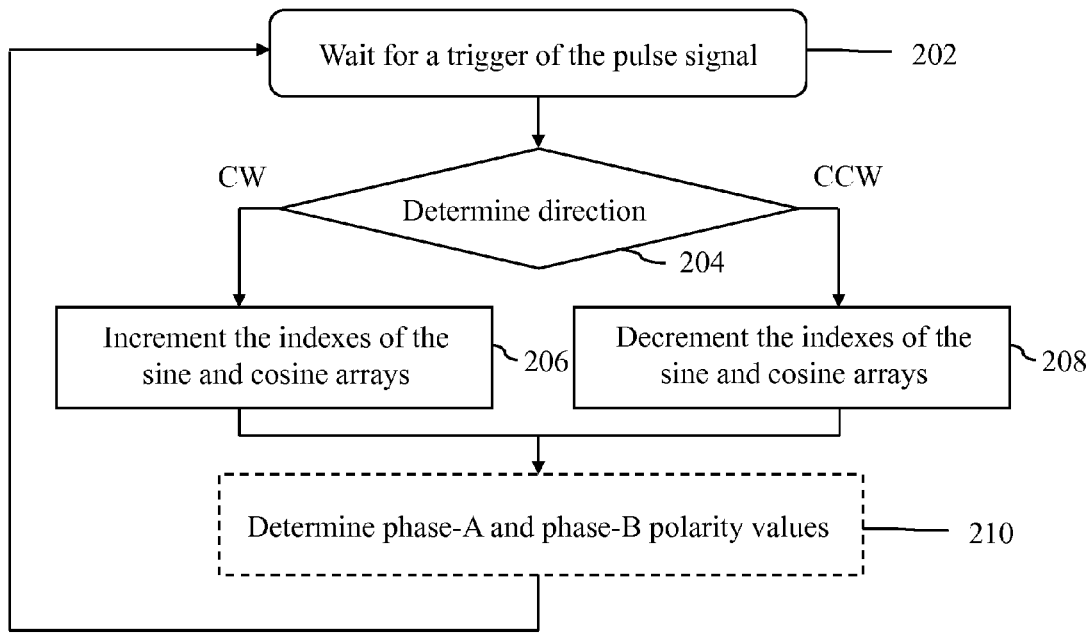
FIG. 2A is a process flow diagram of an interrupt service routine of a microcontroller of the device of FIG. 1, which is functioning as a translator, in accordance with an embodiment of the invention.
Figure 2B:
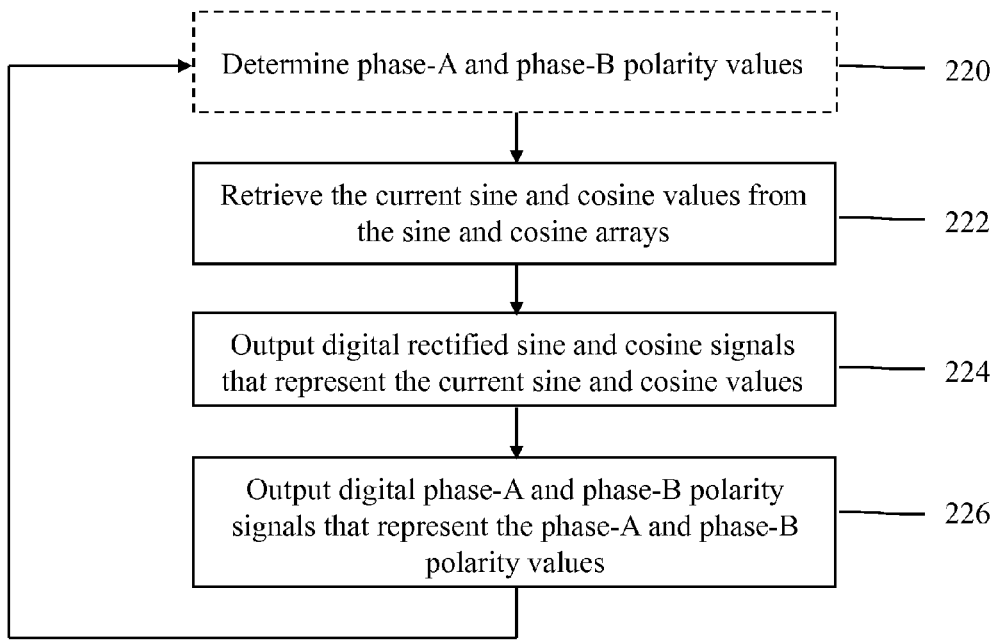
FIG. 2B is a process flow diagram of a non-interrupt routine of the microcontroller in accordance with an embodiment of the invention.

The microstepping control operation of the microcontroller 104 is now described with reference to process flow diagrams of FIGS. 2A and 2B. The flow diagram of FIG. 2A is a flow diagram of the high priority interrupt service routine 126 performed by the microcontroller 104. The flow diagram of FIG. 2B is a flow diagram of the low priority non-interrupt routine 128 performed by the microcontroller 104.

As illustrated in FIG. 2A, the interrupt service routine 126 of the microcontroller 104 begins at block 202, where the interrupt service routine waits for a trigger of the pulse signal from the external controller. When a trigger is received, the interrupt service routine 126 is initiated. Next, at block 204, a determination is made whether the direction signal indicates a clockwise direction or a counterclockwise direction. As an example, a high direction signal may indicate a clockwise direction, while a low direction signal may indicate a counterclockwise direction.

If the direction signal indicates a clockwise direction, the interrupt service routine 126 proceeds to block 206, where indexes or pointers of the sine and cosine arrays 120A and 120B are incremented to the next sine and cosine values, which would now be the current sine and cosine values. If the direction signal indicates a counterclockwise direction, the interrupt service routine 126 proceeds to block 208, where the indexes of the sine and cosine arrays 120A and 120B are decremented to the next sine and cosine values, which would now be the current sine and cosine values. In other embodiments, the indexes of the sine and cosine arrays 120A and 120B may be decremented when the direction signal indicates a clockwise direction and incremented when the direction signal indicates a counterclockwise direction.

Next, at optional block 210, the phase-A and phase-B polarity values that represent the polarities of the current rectified sine and cosine values are determined. In this embodiment, the determination of the phase-A and phase-B polarity values is executed as part of the interrupt service routine 126 of the microcontroller 104. However, in other embodiments, the determination of the phase-A and phase-B polarity values is executed as part of the low priority non-interrupt routine 128 of the microcontroller 104 rather than as part of the interrupt service routine 126 of the microcontroller 104.

After block 210, the interrupt service routine 126 proceeds back to block 202, where the interrupt service routine waits for another trigger of the pulse signal from the external controller, which would again trigger the interrupt service routine.

As illustrated in FIG. 2B, the low priority non-interrupt routine 128 of the microcontroller 104 begins at optional block 220, where the phase-A and phase-B polarity values that represent the polarities of the current rectified sine and cosine values are determined, unless these polarity values were already determined during the interrupt service routine 126. The current sine and cosine values are the last values indexed during the previous execution of the interrupt service routine 126. Next, at block 222, the current sine and cosine values are retrieved from the sine and cosine arrays 120A and 120B, respectively. Next, at block 224, digital rectified sine and cosine signals corresponding to the retrieved sine and cosine values are outputted to the phase-A and phase-B DACs 112A and 112B. Specifically, the digital sine signal is generated and transmitted to the phase-A DAC 112A and the digital cosine signal is generated and transmitted to the phase-B DAC 112B. Next, at block 226, digital phase-A and phase-B polarity signals that represent the current phase-A and phase-B polarity values, respectively, are outputted to the phase-A and phase-B power converters 114A and 114B. Specifically, the digital phase-A polarity signal is generated and transmitted to the phase-A power converter 114A and the digital phase-B polarity signal is generated and transmitted to the phase-B power converter 114B.

In a conventional microcontroller that is configured to function as a microstepper driver translator, the above-described steps of the interrupt service routine 126 and the non-interrupt routine 128 of the microcontroller 104 are all executed as part of its interrupt service routine. Since the conventional microcontroller must perform all these steps as part of the interrupt service routine, if one or more high pulse signals are received during the execution of the interrupt service routine, these high pulse signals can be lost, i.e., not processed. However, since the microcontroller 104 executes only the critical indexing of the sine and cosine arrays 120A and 120B, the interrupt service routine can be serviced faster, which results in higher pulse signal rate support.

For a low pulse signal rate, the low priority non-interrupt routine 128 will be able handle the required updating steps, e.g., the retrieving of current sine and cosine values from the sine and cosine arrays 120A and 120B and the outputting of current sine and cosine values and phase-A and phase B polarity values as digital signals, for each received trigger of the pulse signal. As the pulse signal rate is increased, the low priority non-interrupt routine 128 will not be able handle the required updating steps for each received trigger of the pulse signal, which will result in some of the updates being missed. However, at high speed stepper motor operation, occasional and periodic missing of updates of the sine and cosine values and the phase-A and phase-B polarity values does not significantly affect the performance of the stepper motor 106 due to the characteristics of a stepper motor at high speed, such as higher back-EMF and inertia.

Figure 3:
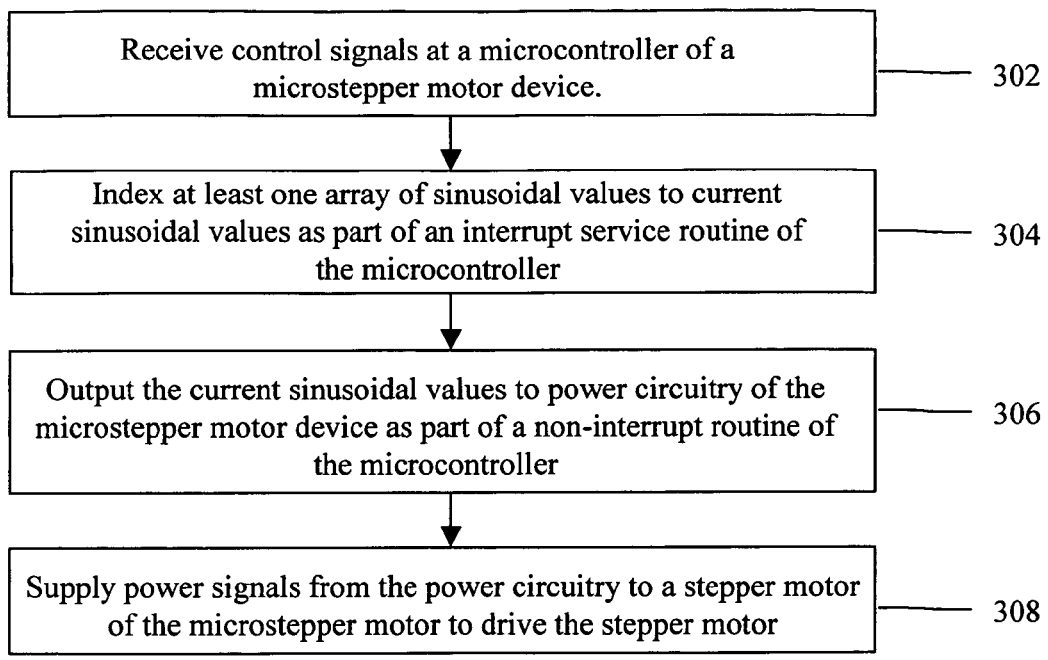
FIG. 3 is a process flow diagram of a method of controlling a microstepper motor device in accordance with an embodiment of the invention.

A method of controlling a microstepper motor device in accordance with an embodiment of the invention is described with reference to a process flow diagram of FIG. 3. At block 302, control signals are received at a microcontroller of the microstepper motor device. Next, at block 304, at least one array of sinusoidal values is indexed to current sinusoidal values as part of an interrupt service routine of the microcontroller. Next, at block 306, the current sinusoidal values are outputted to power circuitry of the microstepper motor device as part of a non-interrupt routine of the microcontroller. Next, at block 308, power signals are supplied from the power circuitry to a stepper motor of the microstepper motor to drive the stepper motor.

Although specific embodiments of the invention have been described and illustrated, the invention is not to be limited to the specific forms or arrangements of parts so described and illustrated. As an example, the invention can be applied to three-phase and five-phase stepper motors. For a three-phase stepper motor, the microcontroller 104 would provide three values from three sine waves that are sixty degrees out of phase using one to three sine arrays with three indexes or pointers, as well as three polarity signals. For a five-phase stepper motor, the microcontroller 104 would provide five values from five sine waves that are thirty-six degrees out of phase using one to five sine arrays with five indexes or pointers, as well as five polarity signals. These sine and polarity values are transmitted to a corresponding number of DACs and power converters to drive the particular stepper motor. In this fashion, the invention can be applied to any multi-phase stepper motor. The scope of the invention is to be defined by the claims appended hereto and their equivalents.

What is claimed is:

1. A microstepper motor device comprising:
   a stepper motor; and
   a motor driver connected to said stepper motor to drive said stepper motor in response to control signals, said motor driver comprising:
      power circuitry connected to said stepper motor to supply power signals to said stepper motor using current sinusoidal values; and
      a microcontroller connected to said power circuitry to provide said current sinusoidal values from at least one array of sinusoidal values to said power circuitry, said microcontroller being configured to index said at least one array of sinusoidal values to said current sinusoidal values in response to said control signals as part of an interrupt service routine of said microcontroller, said microcontroller being further configured to output said current sinusoidal values to said power circuitry as part of a non-interrupt routine of said microcontroller.

2. The device of claim 1 wherein said microcontroller is configured to determine whether a direction signal of said control signals indicates a clockwise direction or a counterclockwise direction as part of said interrupt service routine.

3. The device of claim 1 wherein said microcontroller is configured to determine polarity values that correspond to the polarities of said current sinusoidal values as part of said interrupt service routine.

4. The device of claim 3 wherein said microcontroller is configured to output said polarity values to said driver power circuitry as part of said non-interrupt routine.

5. The device of claim 4 wherein said power circuitry comprises power converters to receive said polarity values and said sinusoidal values to generate said power signals.

6. The device of claim 5 wherein said power circuitry further comprises digital-to-analog converters to receive said sinusoidal values as digital signals and to output analog signals of said sinusoidal values to said power converters.

7. The device of claim 1 wherein said microcontroller is configured to determine polarity values that correspond to the polarities of said current sinusoidal values as part of said non-interrupt routine.

8. The device of claim 1 wherein said microcontroller is configured to retrieve said current sinusoidal values from said at least one array of sinusoidal values as part of said non-interrupt routine.

9. The device of claim 1 wherein said microcontroller is configured to retrieve said current sinusoidal values from a first array of sinusoidal values and a second array of sinusoidal values, said sinusoidal values of said second array being out of phase with respect to said sinusoidal values of said first array.

10. The device of claim 9 wherein said sinusoidal values of said second array are out of phase with respect to said sinusoidal values of said first array by ninety degrees, sixty degrees or thirty-six degrees.

11. A method of controlling a microstepper motor device, said method comprising:
    receiving control signals at a microcontroller of said microstepper motor device;
    indexing at least one array of sinusoidal values to current sinusoidal values in response to said control signals, said indexing being executed as part of an interrupt service routine of said microcontroller;
    outputting said current sinusoidal values to power circuitry of said microstepper motor device, said outputting being executed as part of a non-interrupt routine of said microcontroller; and
    providing power signals from said power circuitry to a stepper motor of said microstepper motor device using said current sinusoidal values to drive said stepper motor.

12. The method of claim 11 further comprising determining whether a direction signal of said control signals indicates a clockwise direction or a counterclockwise direction, said determining being executed as part of said interrupt service routine of said microcontroller.

13. The method of claim 11 further comprising determining polarity values that correspond to the polarities of said current sinusoidal values, said determining being executed as part of said interrupt service routine of said microcontroller.

14. The method of claim 13 further comprising outputting said polarity values to said power circuitry, said outputting said polarity values being executed as part of said non-interrupt routine of said microcontroller.

15. The method of claim 14 wherein said providing said power signals includes receiving said polarity values and said sinusoidal values at power converters of said power circuitry to generate said power signals using said polarity and sinusoidal values.

16. The method of claim 15 wherein said providing said power signals further comprises receiving said sinusoidal values as digital signals at digital-to-analog converters of said power circuitry and outputting analog signals of said sinusoidal values from said digital-to-analog converters to said power converters.

17. The method of claim 11 further comprising determining polarity values that correspond to the polarities of said current sinusoidal values, said determining being executed as part of said non-interrupt routine of said microcontroller.

18. The method of claim 11 further comprising retrieving said current sinusoidal values from said at least one array of sinusoidal values, said retrieving being executed as part of said non-interrupt routine of said microcontroller.

19. The method of claim 18 wherein said retrieving includes retrieving said current sinusoidal values from a first array of sinusoidal values and a second array of sinusoidal values, said sinusoidal values of said second array being out of phase with respect to said sinusoidal values of said first array.

20. The method of claim 19 wherein said sinusoidal values of said second array are out of phase with respect to said sinusoidal values of said first array by ninety degrees, sixty degrees or thirty-six degrees.

* * * * *